(12) United States Patent
Yang et al.

(10) Patent No.: US 11,829,723 B2
(45) Date of Patent: *Nov. 28, 2023

(54) SYSTEM FOR PREDICTING DOCUMENT REUSE

(71) Applicant: Microsoft Technology Licensing, LLC, Redmond, WA (US)

(72) Inventors: Chenguang Yang, Seattle, WA (US); Susan Elizabeth Sullivan, Seattle, WA (US); Deqing Chen, Bellevue, WA (US); Mahaveer Bhavarlal Kothari, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 740 days.

This patent is subject to a terminal disclaimer.

(21) Appl. No.: 16/655,422

(22) Filed: Oct. 17, 2019

(65) Prior Publication Data

US 2021/0117714 A1    Apr. 22, 2021

(51) Int. Cl.

| | |
|---|---|
| *G06K 9/00* | (2022.01) |
| *G06F 40/30* | (2020.01) |
| *G06F 40/166* | (2020.01) |
| *G06V 30/416* | (2022.01) |
| *G06V 30/418* | (2022.01) |

(Continued)

(52) U.S. Cl.
CPC ............ *G06F 40/30* (2020.01); *G06F 18/214* (2023.01); *G06F 18/2113* (2023.01); *G06F 40/166* (2020.01); *G06V 30/416* (2022.01); *G06V 30/418* (2022.01)

(58) Field of Classification Search
CPC .... G06K 9/623; G06K 9/6256; G06F 40/166; G06V 30/416; G06V 30/418
See application file for complete search history.

(56) References Cited

U.S. PATENT DOCUMENTS

| | | | |
|---|---|---|---|
| 6,167,370 | A | 12/2000 | Tsourikov et al. |
| 6,845,374 | B1 | 1/2005 | Oliver et al. |
| 7,603,626 | B2 | 10/2009 | Williams et al. |

(Continued)

OTHER PUBLICATIONS

Gribble, Jeannette, "Microsoft Word 2013: Inserting File Name, Document Title, Authors & Other Property Details into a Document", Nov. 12, 2013, 1 page + 1 SS.*

(Continued)

*Primary Examiner* — Cesar B Paula
*Assistant Examiner* — David Faber
(74) *Attorney, Agent, or Firm* — Schwegman Lundberg & Woessner, P.A.

(57) ABSTRACT

A system and method for identifying relevant content from other documents and presenting candidate documents in a document authoring application is described. The system identifies a pattern of events from the document authoring application. The system receives a request to identify candidate documents pertinent to a document present in the document authoring application. A set of candidate documents is identified from a document library based on the pattern of events, a reuse score for each candidate document, a similarity score for each candidate document, and content in the document present in the document authoring application. The set of candidate documents is provided in a user interface element of the document authoring application.

19 Claims, 15 Drawing Sheets

(51) Int. Cl.
*G06F 18/2113* (2023.01)
*G06F 18/214* (2023.01)

(56) References Cited

U.S. PATENT DOCUMENTS

| | | | |
|---|---|---|---|
| 9,501,490 B2 | 11/2016 | Evans et al. | |
| 9,881,010 B1 | 1/2018 | Gubin et al. | |
| 10,108,615 B2* | 10/2018 | Masson | G06F 40/274 |
| 10,394,949 B2* | 8/2019 | Chilakamarri | G06F 16/27 |
| 11,307,881 B1 | 4/2022 | Bhutani et al. | |
| 2004/0019846 A1 | 1/2004 | Castellani et al. | |
| 2005/0144162 A1 | 6/2005 | Liang | |
| 2006/0212415 A1 | 9/2006 | Backer et al. | |
| 2007/0250901 A1 | 10/2007 | McIntire et al. | |
| 2008/0250331 A1 | 10/2008 | Tulshibagwale | |
| 2009/0217196 A1 | 8/2009 | Neff et al. | |
| 2010/0030764 A1 | 2/2010 | Koren et al. | |
| 2010/0094799 A1 | 4/2010 | Ohashi et al. | |
| 2011/0113320 A1 | 5/2011 | Neff et al. | |
| 2012/0278707 A1 | 11/2012 | Kadowaki et al. | |
| 2013/0066673 A1 | 3/2013 | Rose et al. | |
| 2013/0262454 A1 | 10/2013 | Srikrishna et al. | |
| 2013/0262537 A1 | 10/2013 | Srikrishna et al. | |
| 2013/0262593 A1 | 10/2013 | Srikrishna et al. | |
| 2013/0262596 A1 | 10/2013 | Srikrishna et al. | |
| 2013/0339846 A1 | 12/2013 | Buscemi | |
| 2014/0025669 A1 | 1/2014 | Srikrishna et al. | |
| 2014/0032541 A1 | 1/2014 | Srikrishna et al. | |
| 2014/0032542 A1 | 1/2014 | Srikrishna et al. | |
| 2014/0032545 A1 | 1/2014 | Srikrishna et al. | |
| 2014/0040238 A1 | 2/2014 | Scott et al. | |
| 2014/0040253 A1 | 2/2014 | Srikrishna et al. | |
| 2014/0040254 A1 | 2/2014 | Srikrishna et al. | |
| 2014/0081963 A1 | 3/2014 | Srikrishna et al. | |
| 2014/0282921 A1* | 9/2014 | Filman | H04L 63/08 726/5 |
| 2014/0372933 A1 | 12/2014 | Shirolkar et al. | |
| 2015/0177925 A1 | 6/2015 | Villaron | |
| 2015/0199345 A1 | 7/2015 | Joshi et al. | |
| 2015/0215371 A1* | 7/2015 | Zamir | H04L 67/025 709/203 |
| 2015/0339310 A1 | 11/2015 | Pursche et al. | |
| 2016/0072772 A1* | 3/2016 | Geigel | H04L 9/083 713/164 |
| 2016/0092404 A1 | 3/2016 | Farouki et al. | |
| 2016/0092405 A1 | 3/2016 | Lee et al. | |
| 2016/0092419 A1 | 3/2016 | Morris et al. | |
| 2016/0092428 A1 | 3/2016 | Llic et al. | |
| 2016/0094499 A1 | 3/2016 | Walker | |
| 2016/0148280 A1 | 5/2016 | Marth et al. | |
| 2016/0306798 A1 | 10/2016 | Guo et al. | |
| 2017/0031575 A1* | 2/2017 | Dotan-Cohen | G06F 3/04842 |
| 2017/0060917 A1 | 3/2017 | Marsh | |
| 2017/0154188 A1* | 6/2017 | Meier | G06F 21/552 |
| 2017/0220535 A1 | 8/2017 | Olsen et al. | |
| 2017/0300535 A1 | 10/2017 | Papineni et al. | |
| 2018/0025084 A1 | 1/2018 | Conlan et al. | |
| 2018/0052587 A1 | 2/2018 | Lapier et al. | |
| 2018/0137681 A1 | 5/2018 | Chang et al. | |
| 2018/0189289 A1 | 7/2018 | Wexler et al. | |
| 2018/0267950 A1 | 9/2018 | De Mello Brandao et al. | |
| 2018/0341638 A1 | 11/2018 | Beriwal et al. | |
| 2018/0349517 A1* | 12/2018 | Kleiman-Weiner | G06F 16/9535 |
| 2018/0352373 A1 | 12/2018 | Sahadi | |
| 2018/0365325 A1 | 12/2018 | Gireesha et al. | |
| 2019/0107940 A1* | 4/2019 | Wynne, IV | G06F 30/00 |
| 2019/0138611 A1 | 5/2019 | Gines Marin et al. | |
| 2019/0138637 A1* | 5/2019 | Hogan | G06F 40/216 |
| 2019/0243890 A1* | 8/2019 | Kwatra | G06F 40/103 |
| 2019/0392049 A1* | 12/2019 | Estes | G06Q 50/205 |
| 2020/0125575 A1 | 4/2020 | Ghoshal et al. | |
| 2020/0210693 A1 | 7/2020 | Scanlan et al. | |
| 2020/0293607 A1 | 9/2020 | Nelson et al. | |
| 2021/0014287 A1 | 1/2021 | Kimball et al. | |
| 2021/0026897 A1 | 1/2021 | Rathje et al. | |
| 2021/0125108 A1* | 4/2021 | Metzler, Jr | G06F 16/93 |
| 2021/0141847 A1 | 5/2021 | Govind et al. | |
| 2021/0211394 A1 | 7/2021 | Hashimoto et al. | |
| 2022/0171823 A1 | 6/2022 | Kwatra et al. | |
| 2022/0236843 A1 | 7/2022 | Wilde et al. | |
| 2022/0237374 A1 | 7/2022 | Wilde et al. | |
| 2023/0016576 A1 | 1/2023 | Wilde et al. | |

OTHER PUBLICATIONS

"LightGBM", Retrieved from: https://lightgbm.readthedocs.io/en/latest/, Retrieved Date: Jul. 15, 2019, 2 Pages.

"Notice of Allowance Issued in U.S. Appl. No. 17/214,518", dated Jun. 15, 2023, 14 Pages.

"International Search Report and Written Opinion Issued in PCT Application No. PCT/US22/011507", dated Apr. 6, 2022, 9 Pages.

"International Search Report and Written Opinion Issued in PCT Application No. PCT/US2021/064479", dated Mar. 7, 2022, 11 Pages.

"Non Final Office Action Issued in U.S. Appl. No. 17/214,518", dated Jul. 20, 2022, 28 Pages.

"Notice of Allowance Issued in U.S. Appl. No. 17/213,706", dated Jul. 28, 2022, 12 Pages.

"Final Office Action Issued in U.S. Appl. No. 17/214,518", dated Jan. 13, 2023, 23 Pages.

"Non Final Office Action Issued in U.S. Appl. No.17/949,623", dated Jan. 25, 2023, 12 Pages.

"Non Final Office Action Issued in U.S. Appl. No. 17/214,518", dated Mar. 20, 2023, 22 Pages.

"Notice of Allowance Issued in U.S. Appl. No. 17/949,623", dated Mar. 30, 2023, 8 Pages.

* cited by examiner

SYSTEM FOR PREDICTING DOCUMENT REUSE

BACKGROUND

The subject matter disclosed herein generally relates to a special-purpose machine that analyzes a user's document and provides candidates documents in a user interface element, including computerized variants of such special-purpose machines and improvements to such variants. Specifically, the present disclosure addresses systems and methods for identifying and displaying candidate documents pertinent to a document present in a document authoring application.

A document authoring application (e.g., Microsoft Word™) is typically used to generate a document and provides the user with a list of recent files accessed by the document authoring application. The list of recent files may not be always be relevant to the user. As such, the user may have to manually search through his folders to identify content from previously generated documents that may be relevant to the document currently present in the document authoring application.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
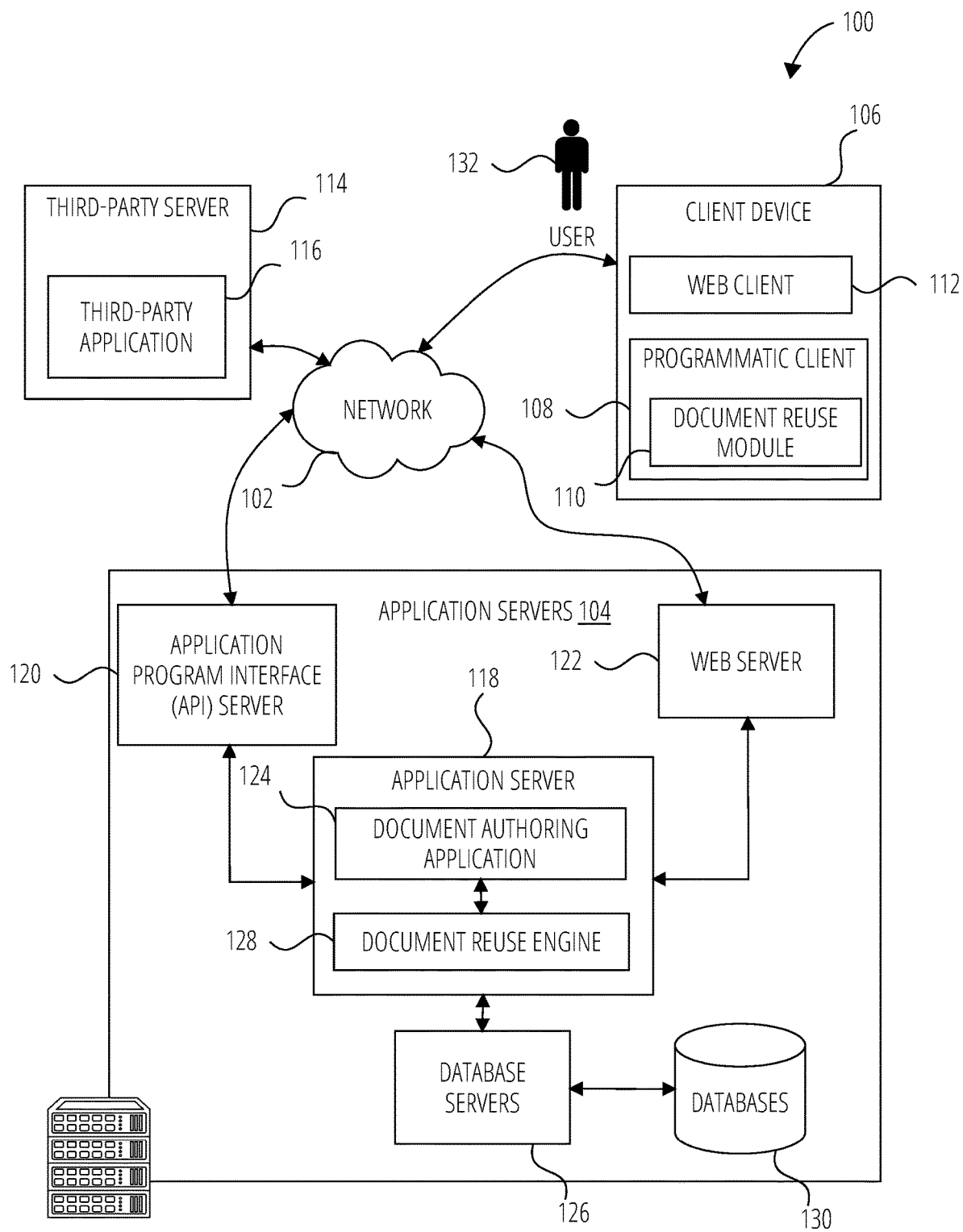
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present application describes a system and method for identifying relevant documents that are pertinent to a user of a document authoring application (e.g., Microsoft Word™, Microsoft PowerPoint™). In one example, the system uses a machine learning model to identify content (from other documents previously authored, edited, shared by the user, or shared with the user) with a high likelihood that the user will reuse the identified content in a document present in the document authoring application. The system then presents the candidate documents in a user interface element of the document authoring application.

In one example, the machine learning model evaluates attributes of a document to compute a score (e.g., a reuse score for ranking documents) for each document. Examples of attributes of documents include, but are not limited to, last accessed time of a document, document creation time, document file size and file type, timestamp a document was shared with the user, whether the document is located in a public or favorite folder, and timestamp of the last access by the user. In another example embodiment, the machine learning model is also based on a current behavior of the user copying content from one document and pasting the copied content to the document present in the document authoring application.

In another example embodiment, the system generates a document semantic similarity score (also referred to as similarity score) for each document. The similarity score is generated, for example, using a DSSM (Deep Semantic Similarity Model), where the feature inputs include: the file name, title, and the 200-character neighborhood around the insertion point (from the document present in the document authoring application), and the file name, title, and document summary (for each candidate document).

In one example, the user belongs to an enterprise. The enterprise represents an organization or groups of users associated with an organization. The users of the enterprise may make use of enterprise applications operating on client machines. Examples of enterprise applications include chat-based applications, email applications, document authoring applications, document editing applications, document viewing applications, document sharing applications, and other types of applications used by enterprises.

In one example embodiment, the present application describes a system and method for identifying relevant content from other documents and presenting candidate documents in a document authoring application. The system identifies a pattern of events from the document authoring application. The system receives a request to identify candidate documents pertinent to a document present in the document authoring application. A set of candidate documents is identified from a document library based on the pattern of events, a reuse score for each candidate document, a similarity score for each candidate document, and content in the document present in the document authoring application. The set of candidate documents is provided in a user interface element of the document authoring application. In another example embodiment, the system identifies the set of candidate documents from the document library based a score computed based on the pattern of events and the content in the document present. The score comprises, but is not limited to, a ranking score that is based on the reuse score and the similarity score. In one example, the similarity score is fed into a first machine learning model alongside other feature inputs (listed below) to generate the ranking score. A separate second machine learning model can be used to generate the similarity score. In other examples, other types of scores can be computed based on attributes of the pattern of events and attributes of the content in the document present.

As a result, one or more of the methodologies described herein facilitate solving the technical problem of searching for items that a user may not be aware. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a network environment in which some example embodiments of the present disclosure may be implemented or deployed. One or more application servers 104 provide server-side functionality via a network 102 to a networked user device, in the form of a client device 106. A user 132 operates the client device 106. The client device 106 includes a web client 112 (e.g., a browser operating a web version of an enterprise application), a programmatic client 108 (e.g., a client-side enterprise document application such as Microsoft PowerPoint™) that is hosted and executed on the client device 106. In one example embodiment, the programmatic client 108 includes a document reuse module 110 that identifies candidate documents with a high likelihood that the user 132 will copy and paste content from into a document present (e.g., being authored or edited) in the programmatic client 108 (or the web client 112).

For example, the document reuse module 110 generates a display of a user interface element (e.g., pane pop-up) that includes candidate documents (e.g., recommended or suggested documents, or relevant content from other documents) in the graphical user interface of the programmatic client 108. The candidate documents may include a set of documents from a library of documents. The library of documents may include documents that have been previously edited, accessed, authored, shared with or by the user 132. The library of documents may be stored in databases 130. In another example embodiment, the library of documents includes additional documents that have not yet been accessed by the user 132 or are yet unknown to the user 132. For example, the system has determined that the additional documents are relevant to the user 132 prior to the user 132 being aware of the additional documents or being shared to the additional documents.

In one example, the document reuse module 110 detects that the user 132 has opened the programmatic client 108. The document reuse module 110 identifies candidate documents based on a profile of the user 132 (e.g., user 132 is a new accountant), events of the programmatic client 108 (e.g., first time the user 132 is using the programmatic client 108, the programmatic client 108 is being operated on a Monday morning), and attributes of documents in the library of documents (e.g., most opened documents from new accounting employees on the first day of their job).

In another example embodiment, the document reuse module 110 detects that the user 132 is writing content for a new document. The document reuse module 110 identifies the content written by the user 132 in the programmatic client 108. The document reuse module 110 uses the identified content to identify candidate documents that the user 132 will most likely reuse portions of the content from the candidate documents in the new document. The document reuse module 110 displays the candidate documents in a new user interface (e.g., new pane) of the programmatic client 108. In another example, the document reuse module 110 uses the identified content to identify content from candidate documents. The document reuse module 110 displays the suggested content in the new user interface (e.g., new pane) of the programmatic client 108.

In another example embodiment, the document reuse module 110 triggers a pane pop-up that includes the candidate documents in response to the user's request to find documents with content relevant to the document currently present in the programmatic client 108. In another example embodiment, the document reuse module 110 learns from the user's behaviors (with respect to the programmatic client 108) and determines whether to trigger the pane pop-up at the programmatic client 108. For example, the document reuse module 110 automatically triggers the pane pop-up only on weekdays morning.

The document reuse module 110 may operate with the web client 112 and/or the programmatic client 108. In another example embodiment, the document reuse module 110 is part of the programmatic client 108 or web client 112. For example, the document reuse module 110 may operate as an extension or add on to the web client 112.

An Application Program Interface (API) server 120 and a web server 122 provide respective programmatic and web interfaces to application servers 104. A specific application server 118 hosts a document authoring application 124 and a document reuse engine 126. Both document authoring application 124 and document reuse engine 126 include components, modules and/or applications.

The document authoring application 124 includes a content creation application (e.g., Microsoft PowerPoint™, Microsoft Word™) that enables the user 132 to form content such as a presentation document, or a text document. In another example, the document authoring application 124 also includes a collaborative application that enables peer enterprise users to collaborate on a shared document. For example, the client device 106 may access the document authoring application 124 to view and edit a document that is shared with other peer users. Other examples of document authoring application 124 includes enterprise systems, content management systems, and knowledge management systems. The document authoring application 124 communicates with the programmatic client 108 on the client device 106. For example, the programmatic client 108 checks in with the document authoring application 124 and verifies a validity of a license or version of the programmatic client 108 on the client device 106. In another example embodiment, the programmatic client 108 includes at least one of a content creation application, a collaborative application, and a shared storage application.

In one example embodiment, the document reuse engine 126 communicates with the document authoring application 124 (or the document reuse module 110) to identify candidate documents based on a machine learning model that uses the content provided by the user 132 in the programmatic client 108 (or in the web client 112, or document authoring application 124) and other signals such as copy and paste activities of the programmatic client 108, profile of the user 132, attributes of the document currently edited in the programmatic client 108, features of documents in a library of documents previously authored, shared, edited by the user 132, or share with the user 132). The document reuse engine 126 communicates with the document reuse module 110 supported by the web server 122 to provide the candidate documents to the programmatic client 108. In another example, the document reuse module 110 includes functionalities of the document reuse engine 126. In another example, the document reuse module 110 includes components of the document reuse engine 126.

In one example embodiment, the web client 112 communicates with the document reuse engine 126 and document authoring application 124 via the programmatic interface provided by the Application Program Interface (API) server 120. In another example embodiment, the document reuse engine 126 sends the candidate documents to the document reuse module 110. The document reuse module 110 causes a display of the candidate documents in a pane pop-up based on current activities of the user 132 at the client device 106, current activities (or events) of the programmatic client 108, and a user profile of the user 132.

In one example embodiment, the document reuse engine 126 trains a machine learning model based on application events (activities of the user 132 on the client device 106 or the document authoring application 124) and features of documents from the library of documents. In another example, the document reuse engine 126 trains the machine learning model offline by first logging the information. The document reuse engine 126 uses the machine learning model to determine whether a document from the library of documents is relevant and includes content that is likely to be reused by the user 132. The document reuse engine 126 identifies a set of candidate documents and causes the document reuse module 110 (or the programmatic client 108 or the web client 112) to display a pane pop-up at the programmatic client 108 or the web client 112.

The application server 118 is shown to be communicatively coupled to database servers 128 that facilitates access to an information storage repository or databases 130. In an example embodiment, the databases 130 includes storage devices that store information to be published and/or processed by the document authoring application 124. For example, the databases 130 include a library of documents (e.g., documents that are shared with the user 132, shared by the user 132, accessed, authored, or edited by the user 132 using the web client 112 or the programmatic client 108).

Additionally, a third-party application 116 executing on a third-party server 114, is shown as having programmatic access to the application server 118 via the programmatic interface provided by the Application Program Interface (API) server 120. For example, the third-party application 116, using information retrieved from the application server 118, may supports one or more features or functions on a website hosted by the third party. For example, the third-party application 116 identifies activities of the user 132 on the programmatic client 108. The third-party application 116 provides the activities to the document reuse engine 126. The document reuse engine 126 identifies candidate documents pertinent to the user 132 based on the activities of the user 132.

Figure 2:
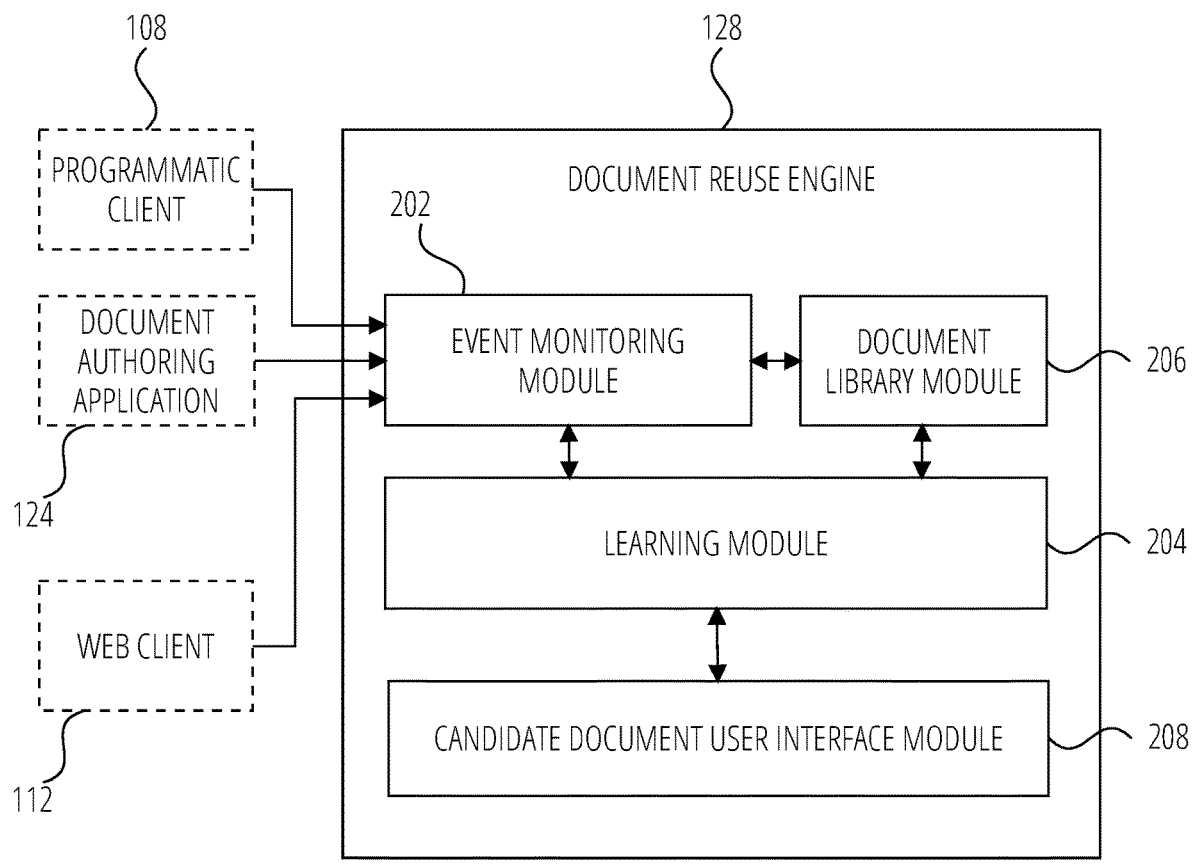
FIG. 2 is a block diagram illustrating a document reuse engine in accordance with one example embodiment.

FIG. 2 is a block diagram illustrating a document reuse engine 126 in accordance with one example embodiment. The event monitoring module 202 accesses user activities data from at least one of the programmatic client 108, the document authoring application 124, and the web client 112. In another example, the event monitoring module 202 combines user activities data from a combination of the programmatic client 108, the document authoring application 124, and the web client 112. In one example embodiment, the user activities data include user application activities within the programmatic client 108, the document authoring application 124, and the web client 112. For example, the user activities data include copy and paste activities (e.g., which previous document was used to copy in a present document, which part of the previous document was copied), file activities (e.g., which files were last opened by the user 132, which files were recently updated from a group folder shared with the user 132), the type of content (e.g., a PowerPoint slide) being created by the user 132, which features of the document authoring application 124, programmatic client 108, and web client 112 are being used by the user 132, and other user activities related to the document authoring application 124, the programmatic client 108, and the web client 112. The event monitoring module 202 provides the user activities data to the learning module 204.

In another example, the event monitoring module 202 identifies a user profile of the user 132 (e.g., user 132 is a new employee, is part of the accounting department group, and has used the programmatic client 108 less than five times). The event monitoring module 202 provides the user profile to the learning module 204.

The document library module 206 accesses a library of documents (that can be accessed with the programmatic client 108) stored in the databases 130. In one example, the library of documents includes documents (e.g., Word documents or PowerPoint documents) that the user 132 has previously viewed, edited, or authored. The library of documents can also include documents shared by the user 132 and documents shared with the user 132. In another example, the library of documents includes documents created by any employee of an enterprise associated with the user 132. In another example, the library of documents includes any documents publicly or privately accessible by the user 132. The document library module 206 accesses the documents and the corresponding attributes of the documents from the library of documents in databases 130, from another storage server, or from another computing device. The document library module 206 provides the documents and corresponding attributes to the learning module 204.

The learning module 204 operates using pattern detection algorithms and trained Machine Learning (ML) models to identify relevant documents (e.g., documents that the user 132 is likely to copy and paste content from). For example, the learning module 204 trains a machine learning model based on the signals from the event monitoring module 202 and the document library module 206 to determine whether a document is likely to be pertinent to the user 132. In one example embodiments, the learning module 204 analyzes events in the document authoring application 124 or programmatic client 108 to identify trends (e.g., a user has frequently chosen a particular document in the past). The learning module 204 accesses the above signals from event monitoring module 202 and the document library module 206. Using the information from the signals, the learning module 204 can identify trends. Based on the machine learning model, the learning module 204 can, in one embodiment, suggest candidate documents.

The learning module 204 provides the set of candidate documents to the candidate document user interface module 208. The candidate document user interface module 208 generates a display of the set of candidate documents in a user interface (e.g., a pane) of the programmatic client 108. In another example, the candidate document user interface module 208 identifies content (that the user 132 is likely to copy and paste) from the set of candidate documents in the user interface.

In another example embodiment, the event monitoring module 202 detects a request to identify relevant documents from the programmatic client 108. In response to the request, the learning module 204 identifies the set of candidate documents that are provided to the candidate document user interface module 208.

Figure 3:
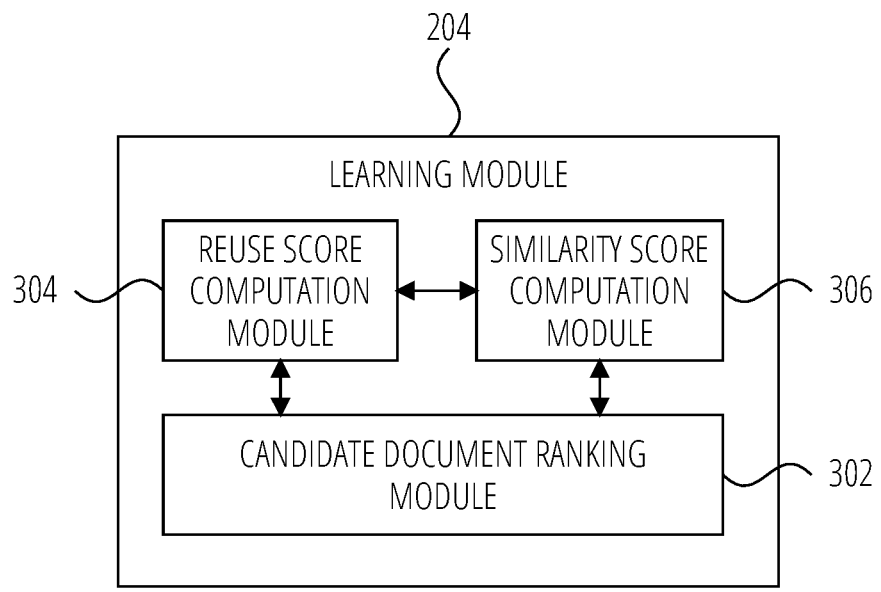
FIG. 3 illustrates a learning module in accordance with one example embodiment.

FIG. 3 is a block diagram illustrating a learning module 204 in accordance with one example embodiment. The learning module 204 includes a reuse score computation module 302, a similarity score computation module 304, and a candidate document ranking module 306.

In one example embodiment, the reuse score computation module 302 computes a reuse score for each document based on a trained machine learning model. The reuse score indicates a likelihood that the user 132 will re-use a content from a previously viewed document into a document present in the programmatic client 108. In one example embodiment, the reuse score computation module 302 trains the machine learning model based on a document selected by the user 132 from a list of candidate documents.

The machine learning model of the reuse score computation module 302 is trained by data from event monitoring module 202 and document library module 206. For example, the data includes labeled data (e.g., for each document, did the user select it?), input features for each document at the time it was shown to the user 132 (e.g., examples of input features are listed below), document groups (e.g., during a search, the user 132 is shown a list of documents, from which the user 132 selected one (or more); documents above the clicked document form the group; a ranking model is trained by adjusting the ranking until selected documents appear higher than non-selected docs in a test or cross-validation set).

Examples of input features of a candidate document include, but are not limited to: LastModifiedByAnyoneDate, CreatedDate, FileSize, FileType, LastSharedWithMeDate, IsPublicFolderFavorite, and LastAccessedByMeDate.

Another example of input features based on a user profile include, but are not limited to: TrendingAroundMeScore, FrequentlyUsedScore, AuthorRankInMyTopNPeople, and LastSharerRankInMyTopNPeople.

Another example of input features based on the last 100 documents opened by the user, but are not limited to: OpenCountInLastHour, OpenCountInLastDay, OpenCountInLastWeek, OpenCountInLastMonth, OpenCountInLast3Months, OpenCountInLast6Months, OpenCountInLastYear, OpenCountTotal, and OpenCountThisDayOfWeek.

Another example of input features based on the last 100 documents modified by the user, but are not limited to: ModifyCountInLastHour, ModifyCountInLastDay, ModifyCountInLastWeek, ModifyCountInLastMonth, ModifyCountInLast3Months, ModifyCountInLast6Months, ModifyCountInLastYear, ModifyCountTotal, ModifyCountThisDayOfWeek.

In another example, the reuse score computation module 302 detects content copied from a prior document (e.g., shared document) into a current document (e.g., document present in the document authoring application 124). The reuse score computation module 302 checks what a zero-term query (e.g. a request to find similar documents without the user providing any search terms) would have looked like at the time the user 132 pasted. Using the list of documents that would have been shown to the user 132, the reuse score computation module 302 finds the document that the user copied from in the list and updates the feature values of the document selected by the user 132. All documents that appear above that document in the list would be negative examples (e.g., examples of documents that the user 132 skipped over and thus may not be as relevant). In one example, the feature values are updated when the document features are stored in a persistent store from which they are fetched for use at runtime. However, if the features are fetched directly at runtime, the feature values are not updated.

The following illustrates an example scenario: the user 132 has 100 documents (e.g., D1 to D100) in their shard (e.g., personal user space in the service). Initially, all 100 documents have null scores indicating that the score is not computed yet. When the user 132 opens and views document D17, the client device 106 sends a signal indicating the event (e.g., opening and viewing document D17) to the document reuse engine 126 to trigger the score computation algorithm. The score computation algorithm (e.g., reuse score computation module 302) computes the score by taking into account the input features listed above and assigns a score to each of the documents (e.g., D1 to D100). Since document D17 was viewed recently, the learning module 204 assigns a higher score (for example, 178). The score 0 is assigned to all other documents. After two days, the user 132 opens the document D53 and modifies it. This signal flows through the system and triggers the score computation algorithm again. The algorithm again computes the score of all the documents and this time assigns the score 168 to D17 and 182 to D53. The user 132 then launches the document reuse module 110 to reuse the documents. The documents D1 to D100 are displayed with D53 at rank 1 and D17 at rank 2 followed by rest of the documents.

In one example, the reuse score is computed prior to receiving the user's request or query for relevant documents. In another example, the reuse score is updated based on events such as the user 132's selection of a candidate document or the user 132's activities.

The candidate document ranking module 306 ranks the candidate documents from the library of documents based on their corresponding reuse score and identifies a top predefined number of documents (e.g., top 200 documents). The candidate document ranking module 306 provides the identified documents to the similarity score computation module 304. In another example, the reuse score computation module 302 uses a machine learning model for ranking documents. For example, the machine learning model can be based on boosted decision trees and the Learning to Rank cost function for the training of the algorithm. The machine learning model itself may be based on a decision tree (nested if statement), where the input feature values are numeric values, and the output score is also a numeric value.

The similarity score computation module 304 computes a similarity score for each document provided by the candidate document ranking module 306. The similarity score indicates a similarity between a document present in the programmatic client 108 and a corresponding document from the top predefined number of documents (e.g., top documents provided by the candidate document ranking module 306). In one example embodiment, the similarity score computation module 304 uses a DSSM algorithm to train a machine learning model and compute the similarity score. The similarity score computation module 304 uses, for example, the following feature inputs to the DSSM algorithm: From the user's document, the filename, title, and the 200 character neighborhood around an insertion point are appended together and input as the 'content'; For each candidate document, the filename, title, and summary are used as the input 'content'. One advantage of this approach is that it does not require downloading and parsing the document.

Those of ordinary skills in the art will recognize that other types of algorithms may be used to train the machine learning model to compute a similarity score. Other examples of algorithms include, but are not limited to, TF-IDF (Term Frequency-Inverse Document Frequency), Keyphrase Extraction—(Finding matches between the key phrases in the user document and the candidate document), Named Entity Extraction—(Finding matches between the named entities in the user document and the candidate document).

The following illustrates an example scenario: the user 132 creates a document D0 named "HVAC Systems Improvement.docx". The document summary is as follows: "Submitted by Contoso Air Conditioning Solutions. Northwinds building of Mechanical Engineering has an outdated HVAC system. They have submitted a public requests for proposals from qualified vendors for the full system improvement. Our firm, Contoso Total Air Conditioning solutions, feel confident and wants to apply in order to meet and exceed the required service expectations for this bid."

The user 132 has 100 documents (D1 to D100) in their shard. The following are examples are some of the documents:

D12: Contoso Workforce Expansion.docx. Summary— Contoso wants to expand its workforce by 30%. It proposes to start the expansion process before end of second quarter of this financial year. This documents lists the logistics related to the proposed expansion.

D19: HVAC Proposal.docx. Summary—This document provides costing details for HVAC Systems Improvement for Northwinds building of Mechanical Engineering.

D64: Contoso RFP 2019.docx. Summary—Contoso is making requests for proposal to various organizations like Northwinds building for upgrading their Air conditional systems.

The similarity score computation module 304 computes the similarity scores between the pairs (D0, D0, (D0, D2), (D0, D3), . . . , (D0, D100). Because D19 has more similarity with D0 for file name and summary, D19 is assigned the similarity score of 0.968. Because D64 has slightly lesser degree of similarity with D0, D64 is assigned the similarity score 0.892. Because there is not much similarity between D12 and D0, D12 is assigned the similarity score 0.023.

Once the similarity score computation module 304 computes the similarity score for each candidate document (e.g., top 200 documents), the candidate document ranking module 306 ranks the candidate documents by similarity score. In one example, the candidate document ranking module 306 identifies a set of candidate documents with top similarity scores (e.g., top 30 documents).

Figure 4:
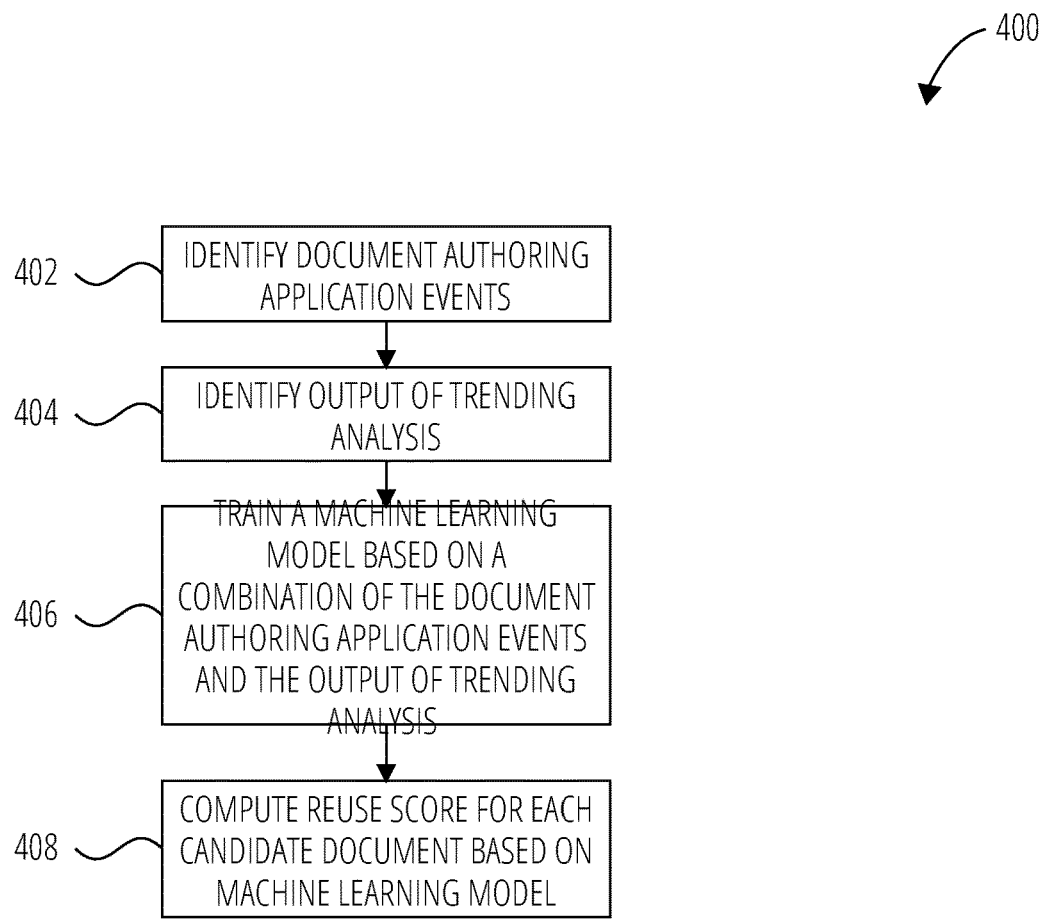
FIG. 4 is a flow diagram illustrating a method for computing a reuse score for a document in accordance with one example embodiment.

FIG. 4 is a flow diagram illustrating a method 400 for computing a reuse score for a document in accordance with one example embodiment. Operations in the method 400 may be performed by the document reuse engine 126, using components (e.g., modules, engines) described above with respect to FIG. 2. Accordingly, the method 400 is described by way of example with reference to the document reuse engine 126. However, it shall be appreciated that at least some of the operations of the method 400 may be deployed on various other hardware configurations or be performed by similar components residing elsewhere. For example, some of the operations may be performed at the document reuse module 110.

At block 402, the event monitoring module 202 identifies document authoring application events. At block 404, the event monitoring module 202 identifies output of trending analysis. At block 406, the learning module 204 trains a machine learning model based on a combination of the document authoring application events and the output of trending analysis. At block 408, the reuse score computation module 302 computes reuse score for each candidate document based on the machine learning model.

Figure 5:
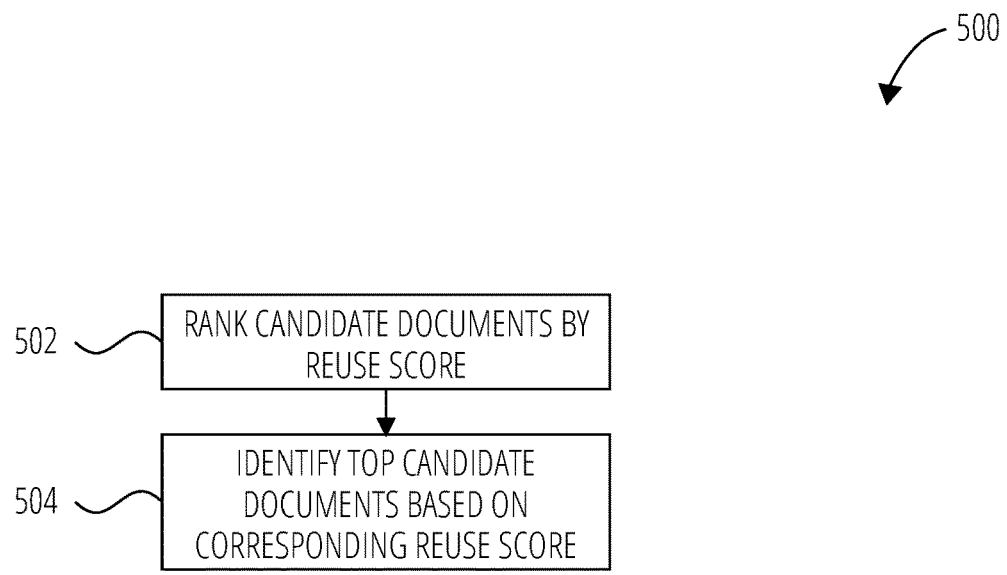
FIG. 5 is a flow diagram illustrating a method for identifying top candidate documents in accordance with one example embodiment.

FIG. 5 is a flow diagram illustrating a method 500 for identifying top candidate documents in accordance with one example embodiment. Operations in the method 500 may be performed by the document reuse engine 126, using components (e.g., modules, engines) described above with respect to FIG. 2. Accordingly, the method 500 is described by way of example with reference to the document reuse engine 126. However, it shall be appreciated that at least some of the operations of the method 500 may be deployed on various other hardware configurations or be performed by similar components residing elsewhere. For example, some of the operations may be performed at the document reuse module 110.

At block 502, the document reuse engine 126 ranks the candidate documents based on their corresponding reuse score. At block 504, the document reuse engine 126 identifies the top candidate documents based on their ranking.

Figure 6:
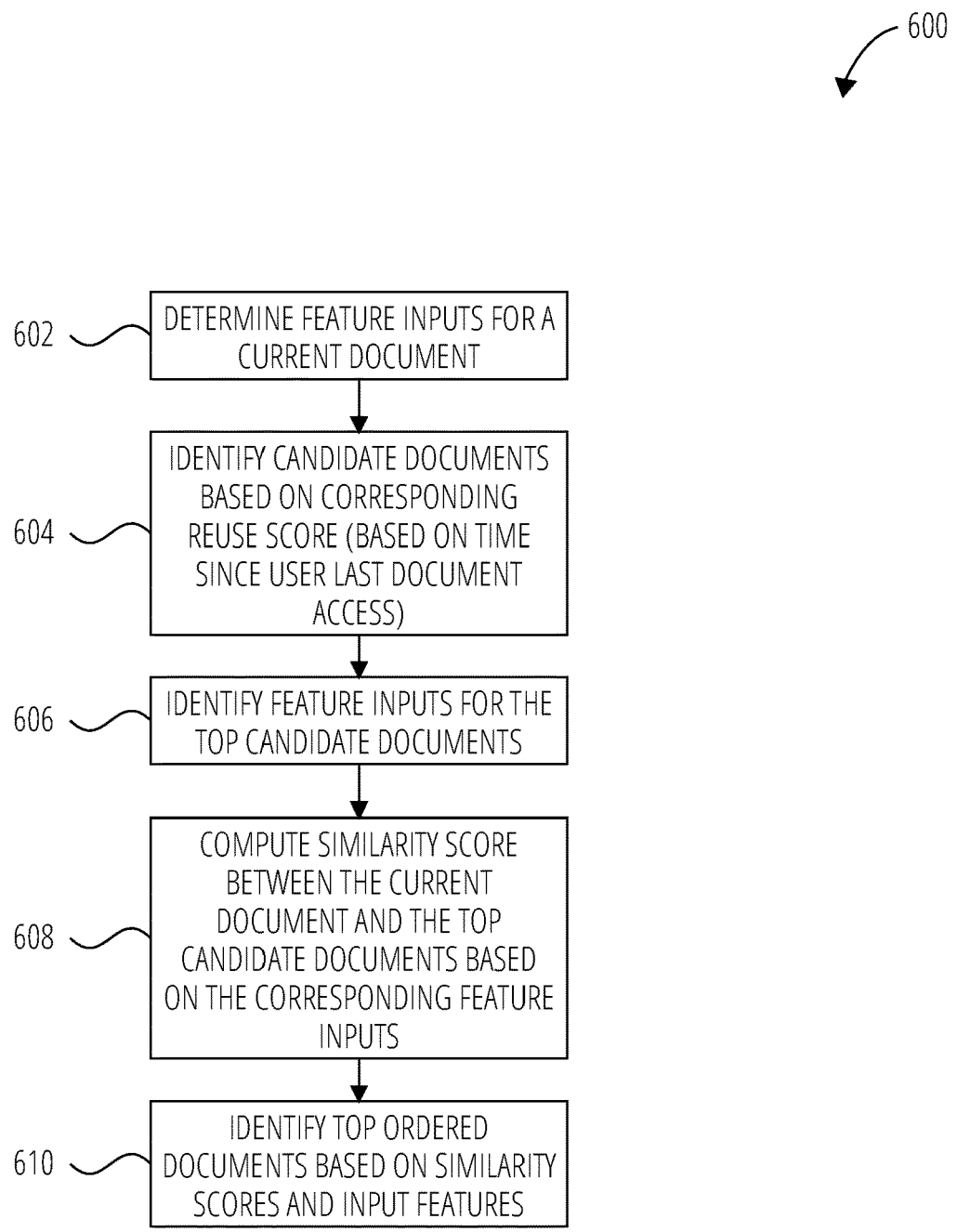
FIG. 6 is a flow diagram illustrating a method for identifying top candidate documents in accordance with another example embodiment.

FIG. 6 is a flow diagram illustrating a method 600 for identifying top candidate documents in accordance with another example embodiment. Operations in the method 600 may be performed by the document reuse engine 126, using components (e.g., modules, engines) described above with respect to FIG. 2. Accordingly, the method 600 is described by way of example with reference to the document reuse engine 126. However, it shall be appreciated that at least some of the operations of the method 600 may be deployed on various other hardware configurations or be performed by similar components residing elsewhere. For example, some of the operations may be performed at the document reuse module 110.

At block 602, the learning module 204 determines feature inputs for a current document. At block 604, the learning module 204 identifies candidate documents based on corresponding reuse score. In one example, the learning module 204 identifies candidate documents based on time since the user last accessed the documents. At block 606, the learning module 204 identifies feature inputs for the top candidate documents. At block 608, the learning module 204 computes similarity scores between the current document and the top candidate documents based on the corresponding feature inputs. At block 610, the learning module 204 identifies top ordered documents based on corresponding similarity scores. In one example, the learning module 204 identifies the top ordered documents based on the similarity score and the input features described above. This is performed by running the trained machine language model as described above.

Figure 7:
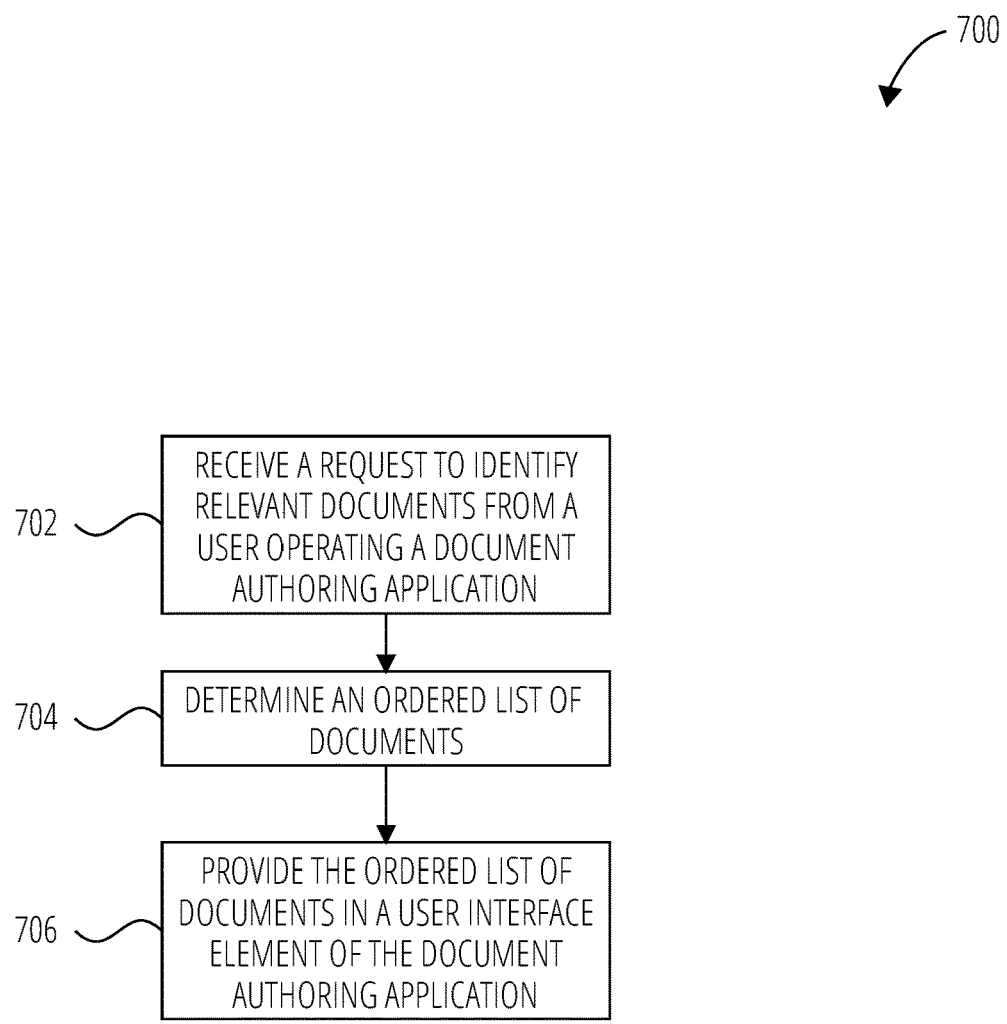
FIG. 7 is a flow diagram illustrating a method for providing candidate documents in accordance with one example embodiment.

FIG. 7 is a flow diagram illustrating a method 700 for providing candidate documents in accordance with one example embodiment. Operations in the method 700 may be performed by the document reuse engine 126, using components (e.g., modules, engines) described above with respect to FIG. 2. Accordingly, the method 700 is described by way of example with reference to the document reuse engine 126. However, it shall be appreciated that at least some of the operations of the method 700 may be deployed on various other hardware configurations or be performed by similar components residing elsewhere. For example, some of the operations may be performed at the document reuse module 110.

At block 702, the document reuse engine 126 receives a request to identify relevant documents from a user operating a document authoring application. At block 704, the learning module 204 determines an ordered list of documents. The ordering of the list of documents is determined by a ranking score (e.g., based on reuse score and similarity score) At block 706, the candidate document user interface module 208 provides the ordered list of documents in a user interface element of the document authoring application 124.

Figure 8:
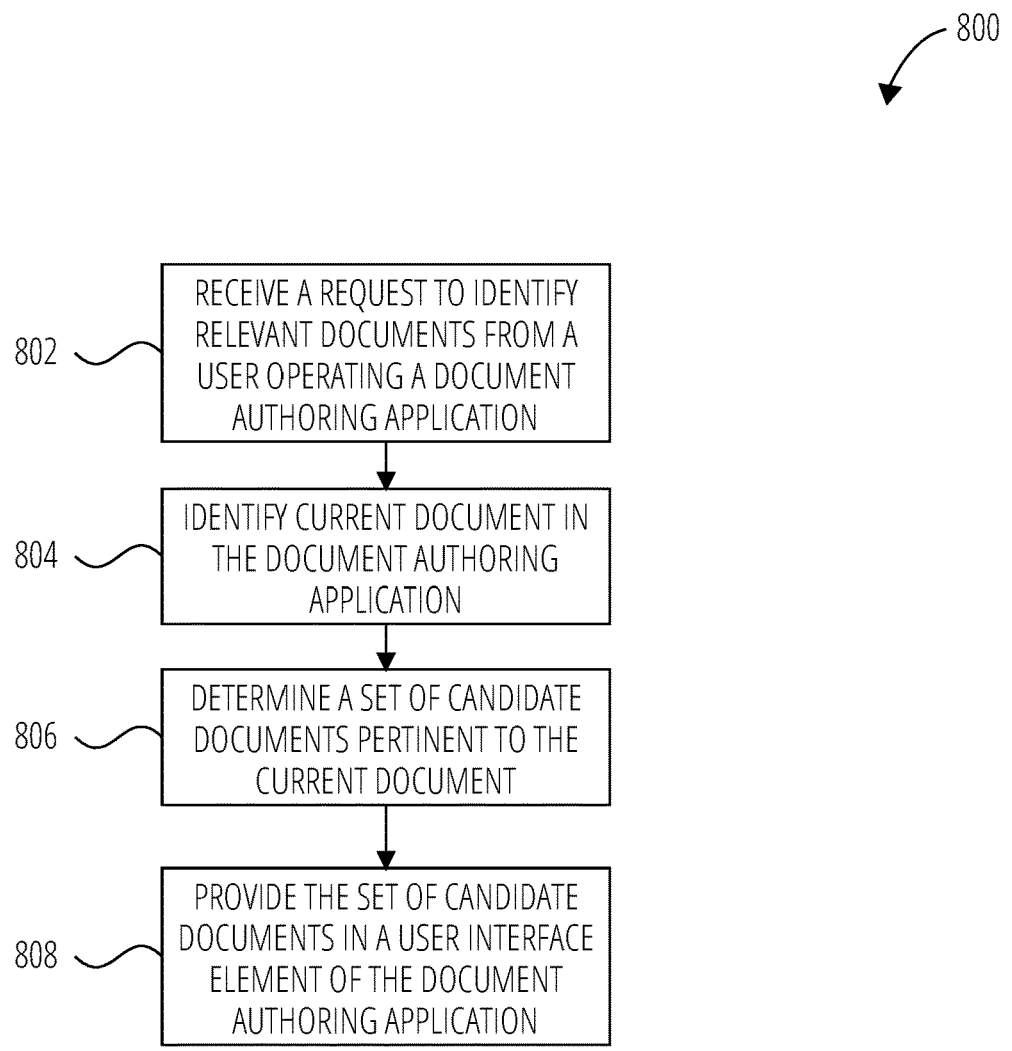
FIG. 8 is a flow diagram illustrating a method for providing candidate documents in accordance with another example embodiment.

FIG. 8 is a flow diagram illustrating a method 800 for providing candidate documents in accordance with another example embodiment. Operations in the method 800 may be performed by the document reuse engine 126, using components (e.g., modules, engines) described above with respect to FIG. 2. Accordingly, the method 800 is described by way of example with reference to the document reuse engine 126. However, it shall be appreciated that at least some of the operations of the method 800 may be deployed on various other hardware configurations or be performed by similar components residing elsewhere. For example, some of the operations may be performed at the document reuse module 110.

At block 802, the document reuse engine 126 receives a request to identify relevant documents from a user operating document authoring application 124. At block 804, the event monitoring module 202 identifies a current document in the document authoring application 124. At block 806, the learning module 204 determines a set of candidate documents pertinent to the current document. At block 808, the candidate document user interface module 208 provides the set of candidate documents in a user interface element of the document authoring application 124.

Figure 9:
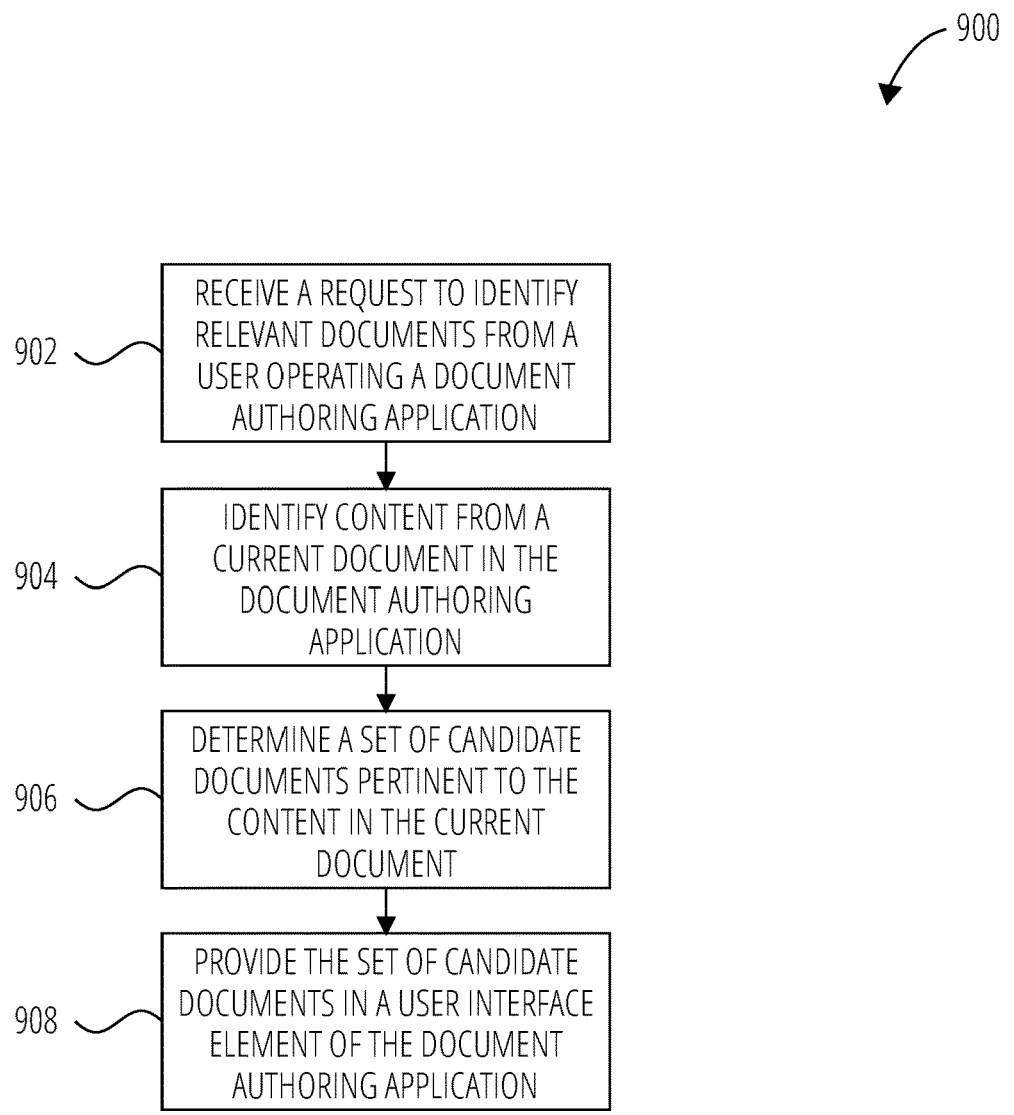
FIG. 9 is a flow diagram illustrating a method for providing candidate documents in accordance with another example embodiment.

FIG. 9 is a flow diagram illustrating a method 900 for providing candidate documents in accordance with one example embodiment. Operations in the method 900 may be performed by the document reuse engine 126, using components (e.g., modules, engines) described above with respect to FIG. 2. Accordingly, the method 900 is described by way of example with reference to the document reuse engine 126. However, it shall be appreciated that at least some of the operations of the method 900 may be deployed on various other hardware configurations or be performed by similar components residing elsewhere. For example, some of the operations may be performed at the document reuse module 110.

At block 902, the document reuse engine 126 receives a request to identify relevant documents from a user operating document authoring application 124. At block 904, the event monitoring module 202 identifies content from a current document in the document authoring application 124. At block 906, the learning module 204 determines a set of candidate documents pertinent to the content in the current document. At block 908, the candidate document user interface module 208 provides the set of candidate documents in a user interface element of the document authoring application 124.

Figure 10:
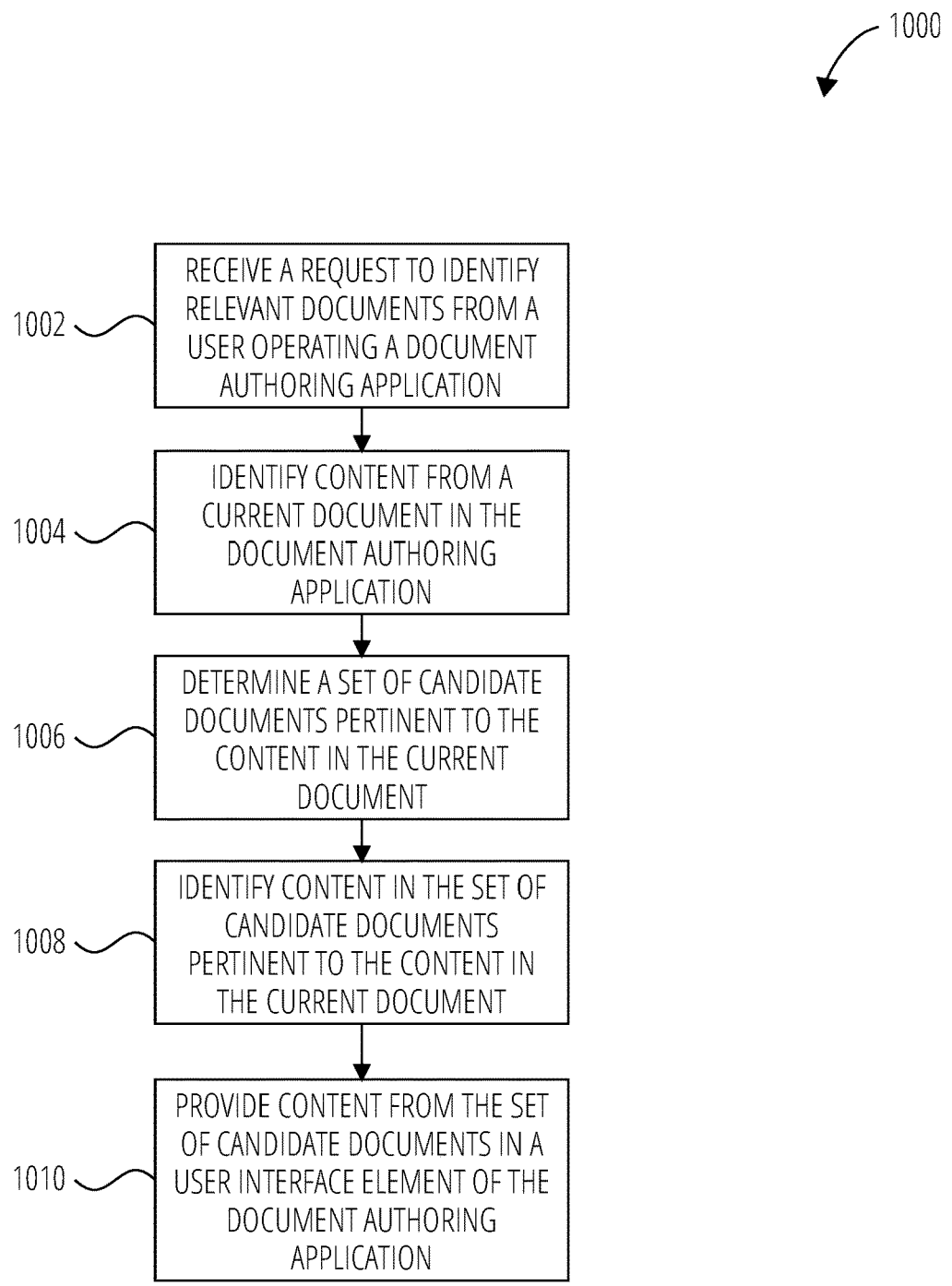
FIG. 10 is a flow diagram illustrating a method for providing candidate documents in accordance with another example embodiment.

FIG. 10 is a flow diagram illustrating a method 1000 for providing candidate documents in accordance with one example embodiment. Operations in the method 1000 may be performed by the document reuse engine 126, using components (e.g., modules, engines) described above with respect to FIG. 2. Accordingly, the method 1000 is described by way of example with reference to the document reuse engine 126. However, it shall be appreciated that at least some of the operations of the method 1000 may be deployed on various other hardware configurations or be performed by similar components residing elsewhere. For example, some of the operations may be performed at the document reuse module 110.

At block 1002, the document reuse engine 126 receives a request to identify relevant documents from a user operating document authoring application 124. At block 1004, the event monitoring module 202 identifies content from a current document in the document authoring application 124. At block 1006, the learning module 204 determines a set of candidate documents pertinent to the content in the current document. At block 1008, the learning module 204 identifies content in the set of candidate documents pertinent to the content in the current document. At block 1010, the candidate document user interface module 208 provides content from the set of candidate documents in a user interface element of document authoring application 124.

Figure 11:
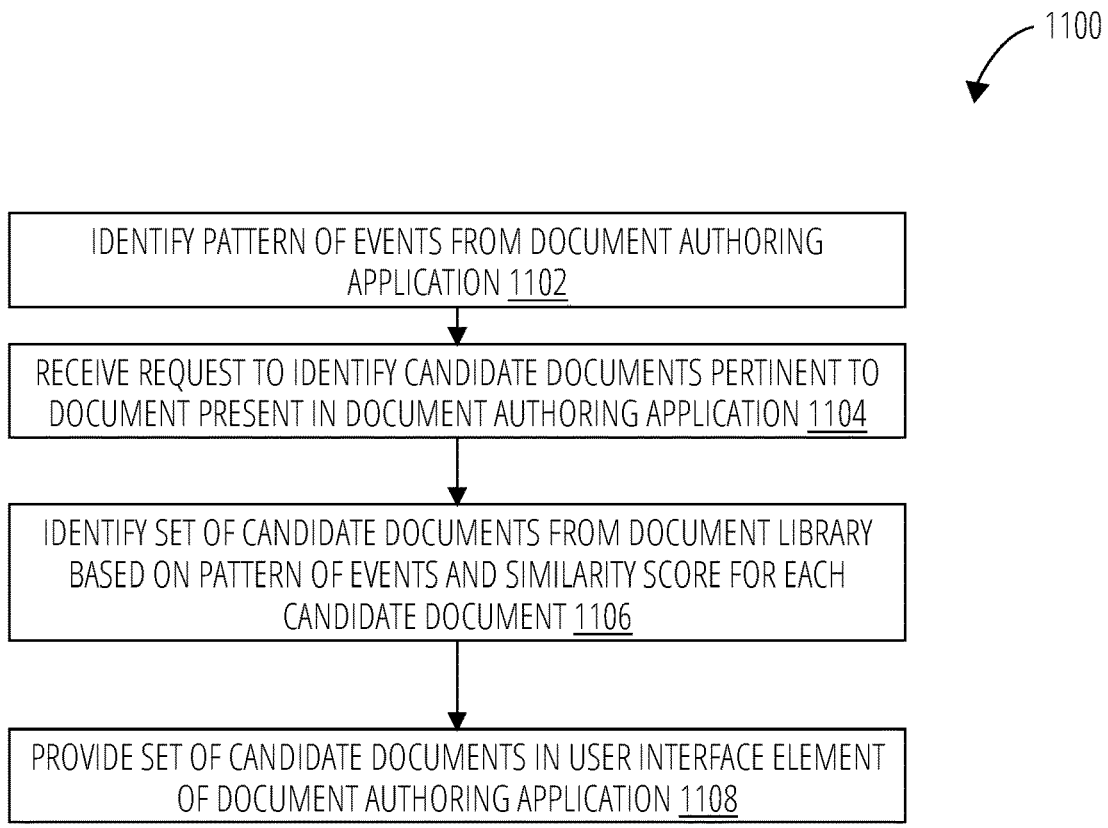
FIG. 11 is a flow diagram illustrates a routine in accordance with one example embodiment.

FIG. 11 is a flow diagram illustrates a routine in accordance with one example embodiment. In block 1102, item 1100 identifies a pattern of events from document authoring application 124. In block 1104, item 1100 receives a request to identify candidate documents pertinent to a document present in the document authoring application 124. In block 1106, item 1100 identifies a set of candidate documents from a document library based on the pattern of events, a reuse score for each candidate document, a similarity score for each candidate document, and content in the document present in the document authoring application. In block 1108, item 1100 provides the set of candidate documents in a user interface element of the document authoring application 124.

Figure 12:
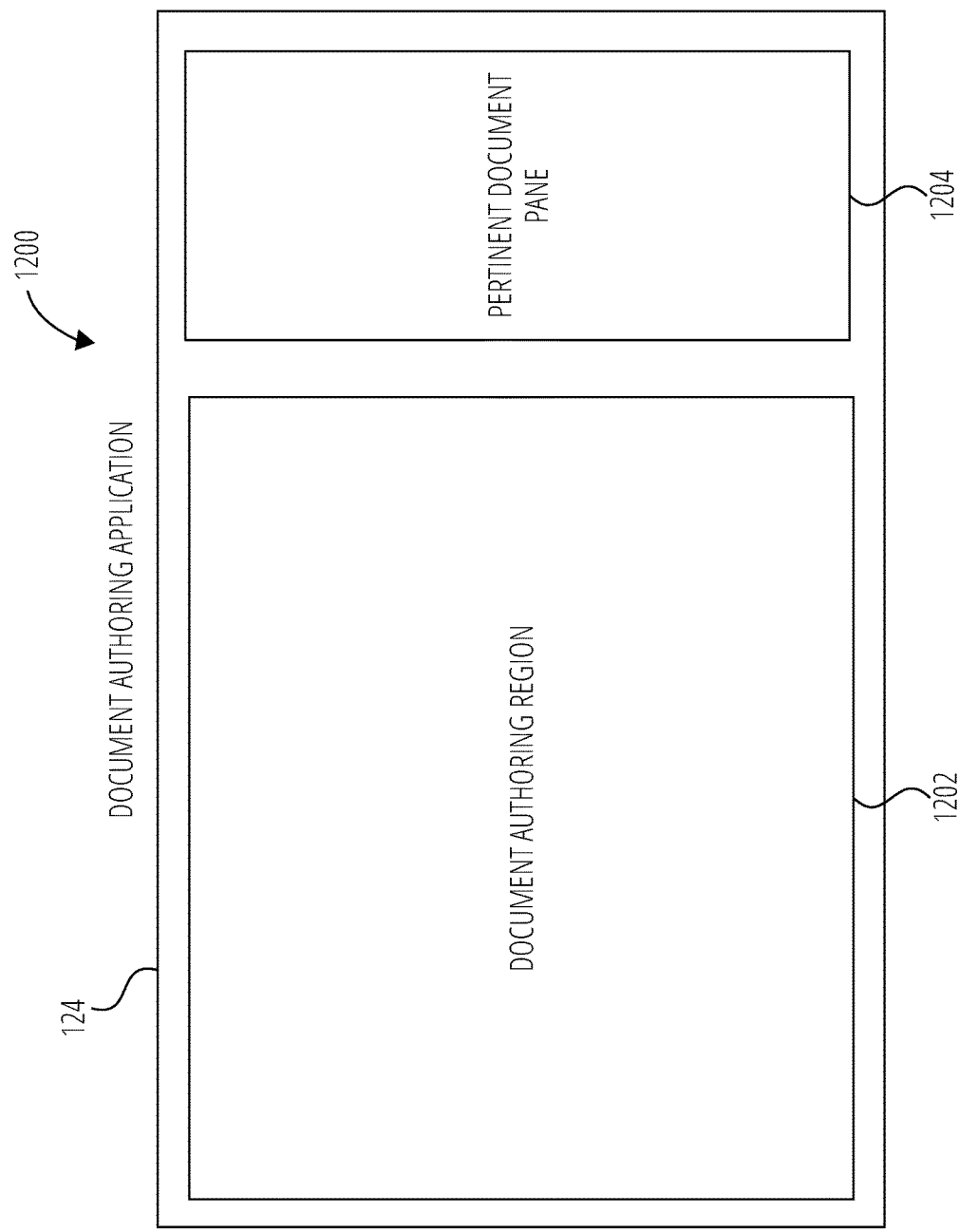
FIG. 12 illustrates an example of a graphical user interface in accordance with one example embodiment.

FIG. 12 illustrates an example of a graphical user interface 1200 in accordance with one example embodiment. The graphical user interface 1200 depicts the document authoring application 124, the document authoring region 1202, the pertinent document pane 1204. For example, the user 132 operates the document authoring application 124 by editing content in the document authoring region 1202. The candidate document user interface module 208 causes a display of the pertinent document pane 1204 based on the content in the document authoring region 1202. The pertinent document pane 1204 includes a pop-up element that is triggered by the content in the document authoring region 1202. The user 132 can then select a suggested content displayed in the pertinent document pane 1204 and then close the pertinent document pane 1204.

Figure 13:
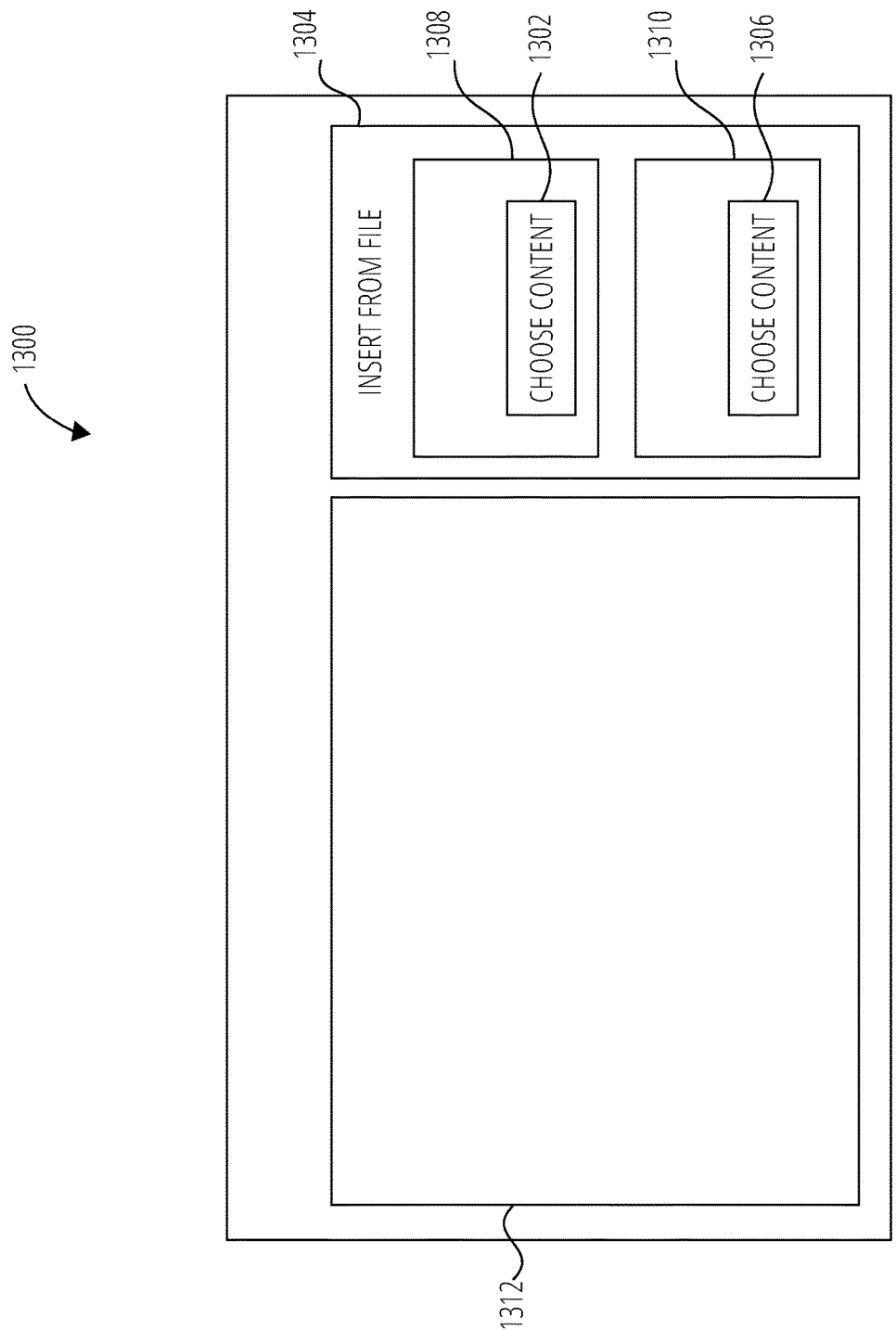
FIG. 13 illustrates an example of a graphical user interface in accordance with one example embodiment.

FIG. 13 illustrates an example of a graphical user interface 1300 in accordance with one example embodiment. The graphical user interface 1300 depicts a screenshot of a user interface of the document authoring application 124. The graphical user interface 1300 includes a document authoring region 1304 and suggested document pane 1302. The user 132 edits a current document in the document authoring region 1304. The suggested document pane 1302 displays top candidate documents (e.g., candidate document 1308, candidate document 1306) as provided by the candidate document ranking module 306. A graphical user interface element 1310, 1312 for selecting a candidate document (or a content of the candidate document) is displayed for each candidate document 1308, 1306.

Figure 14:
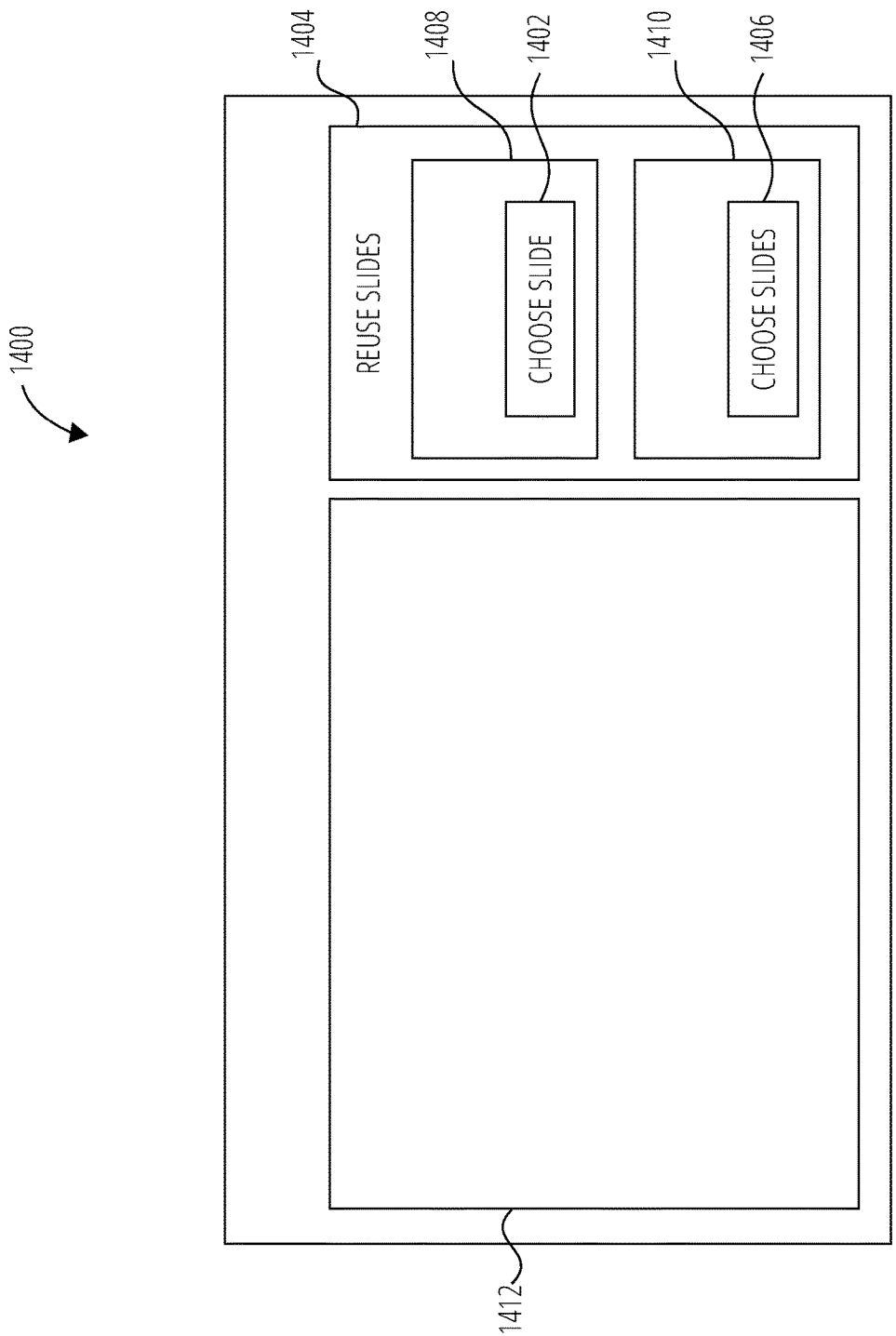
FIG. 14 illustrates another example of a graphical user interface in accordance with one example embodiment.

FIG. 14 illustrates another example of a graphical user interface 1400 in accordance with one example embodiment. The graphical user interface 1400 depicts a screenshot of a user interface of the document authoring application 124. The graphical user interface 1400 includes a current slide 1404 and reuse presentation pane 1402. The user 132 edits a current slide 1404. The reuse presentation pane 1402 displays top candidate documents (e.g., candidate presentation 1408, candidate presentation 1406). A graphical user interface element 1410, 1412 for selecting a candidate document (e.g., a slide or several slides) is displayed for each candidate document 1408, 1406.

Figure 15:
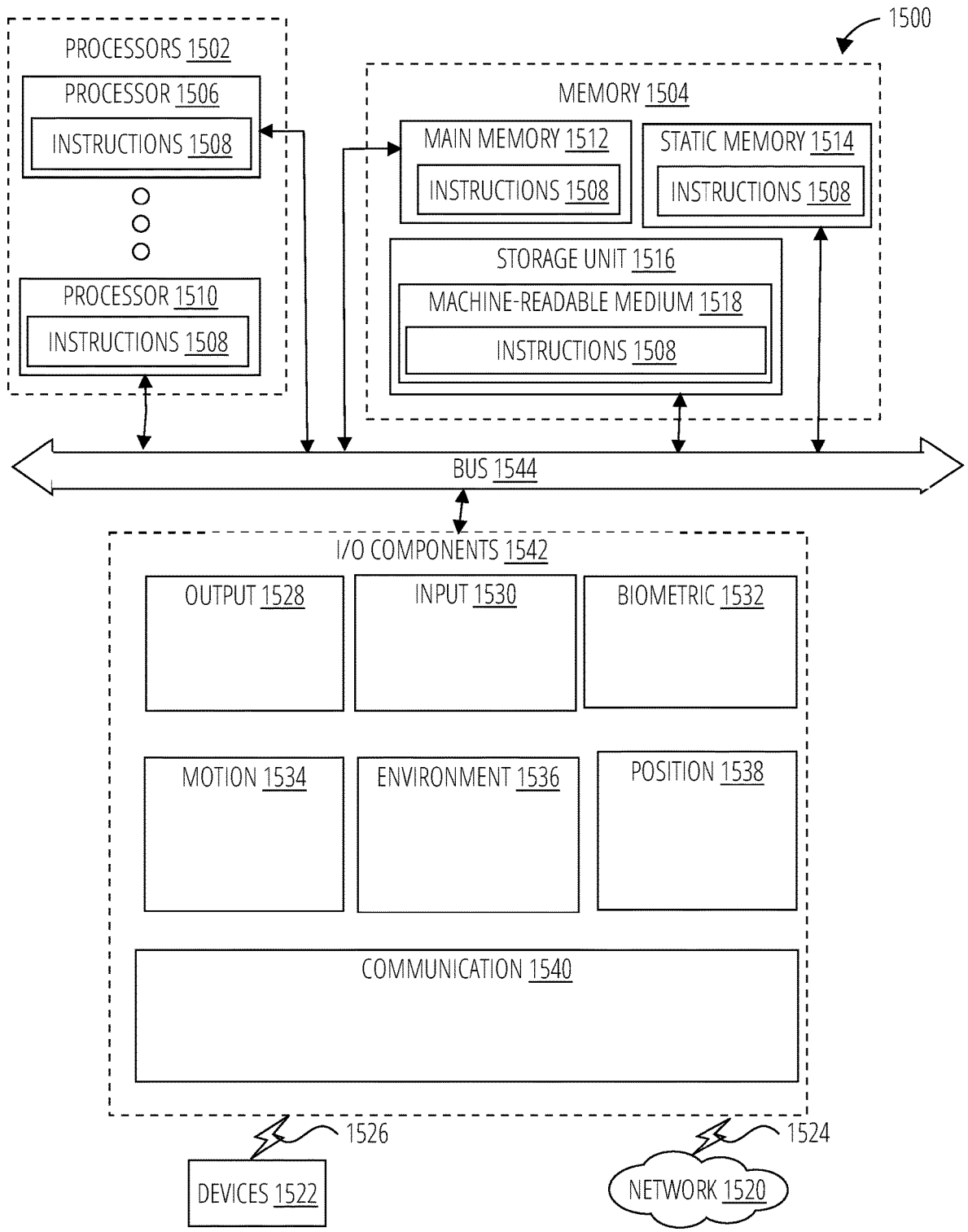
FIG. 15 is a diagrammatic representation of a machine in the form of a computer system within which a set of instructions may be executed for causing the machine to perform any one or more of the methodologies discussed herein, according to an example embodiment.

FIG. 15 is a diagrammatic representation of the machine 1500 within which instructions 1508 (e.g., software, a program, an application, an applet, an app, or other executable code) for causing the machine 1500 to perform any one or more of the methodologies discussed herein may be executed. For example, the instructions 1508 may cause the machine 1500 to execute any one or more of the methods described herein. The instructions 1508 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1508, sequentially or otherwise, that specify actions to be taken by the machine 1500. Further, while only a single machine 1500 is illustrated, the term "machine" shall also be taken to include a collection of machines that individually or jointly execute the instructions 1508 to perform any one or more of the methodologies discussed herein.

The machine 1500 may include processors 1502, memory 1504, and I/O components 1542, which may be configured to communicate with each other via a bus 1544. In an example embodiment, the processors 1502 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1506 and a processor 1510 that execute the instructions 1508. The term "processor" is intended to include multi-core processors that may comprise two or more independent processors (sometimes referred to as "cores") that may execute instructions contemporaneously. Although FIG. 15 shows multiple processors 1502, the machine 1500 may include a single processor with a single core, a single processor with multiple cores (e.g., a multi-core processor), multiple processors with a single core, multiple processors with multiples cores, or any combination thereof.

The memory 1504 includes a main memory 1512, a static memory 1514, and a storage unit 1516, both accessible to the processors 1502 via the bus 1544. The main memory 1504, the static memory 1514, and storage unit 1516 store the instructions 1508 embodying any one or more of the methodologies or functions described herein. The instructions 1508 may also reside, completely or partially, within the main memory 1512, within the static memory 1514, within machine-readable medium 1518 within the storage unit 1516, within at least one of the processors 1502 (e.g., within the processor's cache memory), or any suitable combination thereof, during execution thereof by the machine 1500.

The I/O components 1542 may include a wide variety of components to receive input, provide output, produce output, transmit information, exchange information, capture measurements, and so on. The specific I/O components 1542 that are included in a particular machine will depend on the type of machine. For example, portable machines such as mobile phones may include a touch input device or other such input mechanisms, while a headless server machine will likely not include such a touch input device. It will be appreciated that the I/O components 1542 may include many other components that are not shown in FIG. 15. In various example embodiments, the I/O components 1542 may include output components 1528 and input components 1530. The output components 1528 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1542 may include biometric components 1532, motion components 1534, environmental components 1536, or position components 1538, among a wide array of other components. For example, the biometric components 1532 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1534 include acceleration sensor components (e.g., accelerometer), gravitation sensor components, rotation sensor components (e.g., gyroscope), and so forth. The environmental components 1536 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1542 further include communication components 1540 operable to couple the machine 1500 to a network 1520 or devices 1522 via a coupling 1524 and a coupling 1526, respectively. For example, the communication components 1540 may include a network interface component or another suitable device to interface with the network 1520. In further examples, the communication components 1540 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1522 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geolocation, location via Wi-Fi® signal triangulation, location via detecting an NFC beacon signal that may indicate a particular location, and so forth.

The various memories (e.g., memory 1504, main memory 1512, static memory 1514, and/or memory of the processors 1502) and/or storage unit 1516 may store one or more sets of instructions and data structures (e.g., software) embodying or used by any one or more of the methodologies or functions described herein. These instructions (e.g., the instructions 1508), when executed by processors 1502, cause various operations to implement the disclosed embodiments.

The instructions 1508 may be transmitted or received over the network 1520, using a transmission medium, via a network interface device (e.g., a network interface component included in the communication components 1540) and using any one of a number of well-known transfer protocols (e.g., hypertext transfer protocol (HTTP)). Similarly, the instructions 1508 may be transmitted or received using a transmission medium via the coupling 1526 (e.g., a peer-to-peer coupling) to the devices 1522.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: identifying a pattern of events from a document authoring application; receiving a request to identify candidate documents pertinent to a document present in the document authoring application; identifying a set of candidate documents from a document library based on the pattern of events, a reuse score for each candidate document, a similarity score for each candidate document, and content in the document present in the document authoring application; and providing the set of candidate documents in a user interface element of the document authoring application.

Example 2 is the computer-implemented method of example 1, further comprising: identifying a user profile of a user operating the document authoring application; and training a machine learning model based on the user profile and the pattern of events from the document authoring application.

Example 3 is the computer-implemented method of example 2, wherein the user profile of the user indicates an enterprise profile of the user, collaborators of the user, a group within an enterprise to which the user belongs, an operating system of the client device, and a time and day of the document authoring application activities of the user.

Example 4 is the computer-implemented method of example 1, further comprising: training a machine learning model based on the pattern of events from the document authoring application.

Example 5 is the computer-implemented method of example 4, wherein the pattern of events comprises: copy and paste content data from a first candidate document from the document library to the document present in the document authoring application; features values of the document present in the document authoring application; feature values of the first candidate document selected by the user; and feature values of a second candidate document not selected by the user.

Example 6 is the computer-implemented method of example 5, wherein the feature values of the first candidate document comprise a first plurality of properties of the first candidate document, wherein the feature values of the second candidate document comprise a second plurality of properties of the second candidate document, and wherein the feature values of the document present in the document authoring application comprise a third plurality of properties of the document present in the document authoring application.

Example 7 is the computer-implemented method of example 4, wherein the pattern of events comprises: copy and paste content data from one or more documents in the document library to the document present in the document authoring application; labeled data identifying one or more documents selected by the user; input features for each document when presented to the user; input features for each document when accessed or modified by the user; input features based on a collaboration profile of the user; and document groups identified based on one or more documents selected by the user.

Example 8 is the computer-implemented method of example 1, further comprising: computing the reuse score for each candidate document in the document library based on the machine learning model, the reuse score for each candidate document being indicative of a relevance of each candidate document to the document present in the document authoring application.

Example 9 is the computer-implemented method of example 8, further comprising: ranking each candidate document based on their corresponding reuse score; and identifying top candidate documents from the ranked candidate documents, the set of candidate documents including the top candidate documents.

Example 10 is the computer-implemented method of example 9, further comprising: computing the similarity score for each candidate document from the top candidate documents, the similarity score for each top candidate document being indicative of a similarity between each top candidate document and the document present in the document authoring application.

Example 11 is the computer-implemented method of example 1, further comprising: identifying relevant content from the set of candidate documents, the relevant content being pertinent to the content in the document present in the document authoring application, wherein providing the set of candidate documents in the user interface element of the document authoring application further comprises: identifying the relevant content from the set of candidate documents in the user interface element of the document authoring application.

Example 12 is the computer-implemented method of example 1, wherein the document library includes documents authored, read, edited, and shared by the user of the document authoring application, and documents shared to the user.

Example 13 is the computer-implemented method of example 1, wherein the similarity score is based on a current document feature inputs and candidate document feature inputs, the user document feature inputs comprising a filename, a title, and a preset character neighborhood around an insertion point in the document present in the document authoring application, and the candidate document feature inputs comprising a filename, a title, and a summary of a corresponding candidate document.

Example 14 is the computer-implemented method of example 1, further comprising: causing a display of a first user interface element of the document authoring application adjacent to a second user interface element of the document authoring application in response to receiving the request, the first user interface element comprising the document being formed by the document authoring application, the second user interface element comprising one or more candidate documents from the set of candidate documents.

What is claimed is:

1. A computer-implemented method comprising:
    identifying a pattern of events from a document authoring application;
    receiving a request to identify candidate documents pertinent to a document present in the document authoring application;
    identifying a set of candidate documents from a document library based on the pattern of events, a machine learning model, a reuse score for each candidate document, a similarity score for each candidate document, and content in the document present in the document authoring application;
    providing the set of candidate documents in a user interface element of the document authoring application; and
    training the machine learning model based on the pattern of events from the document authoring application, wherein the pattern of events comprises:
        labeled data identifying one or more documents selected by the user;
        input features for each document when presented to the user;
        input features for each document when accessed or modified by the user;
        input features based on a collaboration profile of the user; and
        document groups identified based on one or more documents selected by the user.

2. The computer-implemented method of claim 1, further comprising:
    identifying a user profile of a user operating the document authoring application; and
    training the machine learning model based on the user profile and the pattern of events from the document authoring application.

3. The computer-implemented method of claim 2, wherein the user profile of the user indicates an enterprise profile of the user, collaborators of the user, a group within an enterprise to which the user belongs, an operating system of a client device, and a time and day of the document authoring application activities of the user.

4. The computer-implemented method of claim 1, wherein the pattern of events comprises:

copy and paste content data from a first candidate document from the document library to the document present in the document authoring application.

5. The computer-implemented method of claim 4, wherein the pattern of events comprises:
features values of the document present in the document authoring application;
feature values of the first candidate document selected by the user; and
feature values of a second candidate document not selected by the user.

6. The computer-implemented method of claim 5, wherein the feature values of the first candidate document comprise a first plurality of properties of the first candidate document,
wherein the feature values of the second candidate document comprise a second plurality of properties of the second candidate document, and
wherein the feature values of the document present in the document authoring application comprise a third plurality of properties of the document present in the document authoring application.

7. The computer-implemented method of claim 1, further comprising:
computing the reuse score for each candidate document in the document library based on the machine learning model,
the reuse score for each candidate document being indicative of a relevance of each candidate document to the document present in the document authoring application.

8. The computer-implemented method of claim 7, further comprising:
ranking each candidate document based on their corresponding reuse score; and
identifying top candidate documents from the ranked candidate documents, the set of candidate documents including the top candidate documents.

9. The computer-implemented method of claim 8, further comprising:
computing the similarity score for each candidate document from the top candidate documents, the similarity score for each top candidate document being indicative of a similarity between each top candidate document and the document present in the document authoring application.

10. The computer-implemented method of claim 1, further comprising:
identifying relevant content from the set of candidate documents, the relevant content being pertinent to the content in the document present in the document authoring application,
wherein providing the set of candidate documents in the user interface element of the document authoring application further comprises: identifying the relevant content from the set of candidate documents in the user interface element of the document authoring application.

11. The computer-implemented method of claim 1, wherein the document library includes documents authored, read, edited, or shared by the user of the document authoring application, and documents shared to the user.

12. The computer-implemented method of claim 1, wherein the similarity score is based on a current document feature inputs and candidate document feature inputs,
the user document feature inputs comprising a filename, a title, and a preset character neighborhood around an insertion point in the document present in the document authoring application, and
the candidate document feature inputs comprising a filename, a title, and a summary of a corresponding candidate document.

13. The computer-implemented method of claim 1, further comprising:
causing a display of a first user interface element of the document authoring application adjacent to a second user interface element of the document authoring application in response to receiving the request,
the first user interface element comprising the document being formed by the document authoring application,
the second user interface element comprising one or more candidate documents from the set of candidate documents.

14. A computing apparatus, the computing apparatus comprising:
a processor; and
a memory storing instructions that, when executed by the processor, configure the apparatus to:
identify a pattern of events from a document authoring application;
receive a request to identify candidate documents pertinent to a document present in the document authoring application;
identify a set of candidate documents from a document library based on the pattern of events, a machine learning model, a reuse score for each candidate document, a similarity score for each candidate document, and content in the document present in the document authoring application;
provide the set of candidate documents in a user interface element of the document authoring application; and
train the machine learning model based on the pattern of events from the document authoring application,
wherein the pattern of events comprises:
labeled data identifying one or more documents selected by the user;
input features for each document when presented to the user;
input features for each document when accessed or modified by the user;
input features based on a collaboration profile of the user; and
document groups identified based on one or more documents selected by the user.

15. The computing apparatus of claim 14, wherein the instructions further configure the apparatus to:
identify a user profile of a user operating the document authoring application; and
train the machine learning model based on the user profile and the pattern of events from the document authoring application.

16. The computing apparatus of claim 15, wherein the user profile of the user indicates an enterprise profile of the user, collaborators of the user, a group within an enterprise to which the user belongs, an operating system of a client device, and a time and day of the document author application activities of the user.

17. The computing apparatus of claim 14, wherein the pattern of events comprises:

copy and paste content data from a first candidate document from the document library to the document present in the document authoring application.

18. The computing apparatus of claim 17, wherein the pattern of events comprises:
   features values of the document present in the document author application;
   feature values of the first candidate document selected by the user; and
   feature values of a second candidate document not selected by the user.

19. A non-transitory machine-readable medium, the machine-readable medium including instructions that when executed by a computer, cause the computer to:
   identify a pattern of events from a document authoring application;
   receive a request to identify candidate documents pertinent to a document present in the document authoring application;
   identify a set of candidate documents from a document library based on the pattern of events, a machine learning model, a reuse score for each candidate document, a similarity score for each candidate document, and content in the document present in the document authoring application;
   provide the set of candidate documents in a user interface element of the document authoring application; and
   train the machine learning model based on the pattern of events from the document authoring application, wherein the pattern of events comprises:
      labeled data identifying one or more documents selected by the user;
      input features for each document when presented to the user;
      input features for each document when accessed or modified by the user;
      input features based on a collaboration profile of the user; and
      document groups identified based on one or more documents selected by the user.

* * * * *